(12) United States Patent
Chen et al.

(10) Patent No.: US 11,252,445 B1
(45) Date of Patent: Feb. 15, 2022

(54) SYSTEMS AND METHODS FOR PROVIDING PASSTHROUGH ADAPTIVE BITRATE VIDEOS

(71) Applicant: Meta Platforms, Inc., Menlo Park, CA (US)

(72) Inventors: Qian Chen, San Jose, CA (US); Shankar Lakshmi Regunathan, Redmond, WA (US); Minchuan Chen, Redmond, WA (US)

(73) Assignee: META PLATFORMS, INC., Menlo Park, CA (US)

( * ) Notice: Subject to any disclaimer, the term of this patent is extended or adjusted under 35 U.S.C. 154(b) by 0 days.

(21) Appl. No.: 16/391,031

(22) Filed: Apr. 22, 2019

(51) Int. Cl.
*H04N 21/234* (2011.01)
*H04N 21/238* (2011.01)
*H04N 19/40* (2014.01)
*H04N 21/2343* (2011.01)
*H04L 29/06* (2006.01)
*H04N 21/2662* (2011.01)

(52) U.S. Cl.
CPC ..... *H04N 21/23418* (2013.01); *H04L 65/605* (2013.01); *H04L 65/607* (2013.01); *H04N 19/40* (2014.11); *H04N 21/23439* (2013.01); *H04N 21/2662* (2013.01)

(58) Field of Classification Search
CPC ............ H04N 21/23418; H04N 19/40; H04N 21/23439; H04N 21/2662; H04L 65/607; H04L 65/605
See application file for complete search history.

(56) References Cited

U.S. PATENT DOCUMENTS

| | | | | |
|---|---|---|---|---|
| 2009/0196344 | A1* | 8/2009 | Brown | H04N 19/59 375/240.02 |
| 2010/0091888 | A1* | 4/2010 | Nemiroff | H04N 21/4385 375/240.28 |
| 2013/0198337 | A1* | 8/2013 | Nix | H04N 21/23439 709/219 |
| 2013/0275557 | A1* | 10/2013 | Myers | H04N 21/64322 709/219 |
| 2016/0134677 | A1* | 5/2016 | Mueller | H04L 65/602 709/219 |
| 2017/0048536 | A1* | 2/2017 | Forehand | H04N 21/2404 |
| 2018/0139258 | A1* | 5/2018 | Margolin | H04L 47/19 |

* cited by examiner

*Primary Examiner* — Alazar Tilahun
(74) *Attorney, Agent, or Firm* — Sheppard Mullin Richter & Hampton LLP

(57) ABSTRACT

Systems, methods, and non-transitory computer-readable media can receive a video uploaded by a user. A determination is made as to whether the video satisfies passthrough eligibility criteria. An ABR video package associated with the video is generated based on the determining whether the video satisfies the passthrough eligibility criteria.

19 Claims, 7 Drawing Sheets

SYSTEMS AND METHODS FOR PROVIDING PASSTHROUGH ADAPTIVE BITRATE VIDEOS

FIELD OF THE INVENTION

The present technology relates to the field of digital content platforms. More particularly, the present technology relates to techniques for providing passthrough adaptive bitrate (ABR) videos.

BACKGROUND

Today, people often utilize computing devices (or systems) for a wide variety of purposes. Users can use their computing devices to, for example, interact with one another, access content, share content, and create content. In some cases, content items can include postings from members of a social networking system. Content items may include media content items, such as videos. Content items may be published to the social networking system or any other content platform for consumption by others.

SUMMARY

Various embodiments of the present technology can include systems, methods, and non-transitory computer readable media configured to receive a video uploaded by a user. A determination is made as to whether the video satisfies passthrough eligibility criteria. An ABR video package associated with the video is generated based on the determining whether the video satisfies the passthrough eligibility criteria.

In an embodiment, determining whether the video satisfies passthrough eligibility criteria comprises determining that the video satisfies the passthrough eligibility criteria. Generating the ABR video package associated with the video comprises generating a passthrough-quality encoding of the video and including the passthrough-quality encoding in the ABR video package based on the determining that the video satisfies the passthrough eligibility criteria.

In an embodiment, generating the passthrough-quality encoding of the video comprises transmuxing the video.

In an embodiment, the passthrough-quality encoding of the video has the same bitrate as the video.

In an embodiment, the passthrough-quality encoding of the video has a segment structure that is compatible with the video for ABR quality switching.

In an embodiment, generating the ABR video package associated with the video further comprises generating a plurality of passthrough-aligned transcodings based on the passthrough-quality encoding, wherein each passthrough-aligned transcoding is associated with a different quality level.

In an embodiment, the plurality of passthrough-aligned transcodings have segment structures that are compatible with the segment structure of the passthrough-quality encoding for ABR quality switching.

In an embodiment, generating the ABR video package associated with the video further comprises generating a manifest associated with the video, wherein the manifest identifies the passthrough-quality encoding and the plurality of passthrough-aligned transcodings.

In an embodiment, the manifest is provided to an ABR video player for playback of the video as an ABR video.

In an embodiment, the one or more passthrough eligibility criteria comprise a bitrate criteria that defines a bitrate threshold, and the bitrate criteria causes a passthrough-quality encoding to be included in the ABR video package if the video has a bitrate that does not exceed the bitrate threshold and causes a passthrough-quality encoding not to be included in the ABR video package if the video has a bitrate that exceeds the bitrate threshold.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

Figure 1:
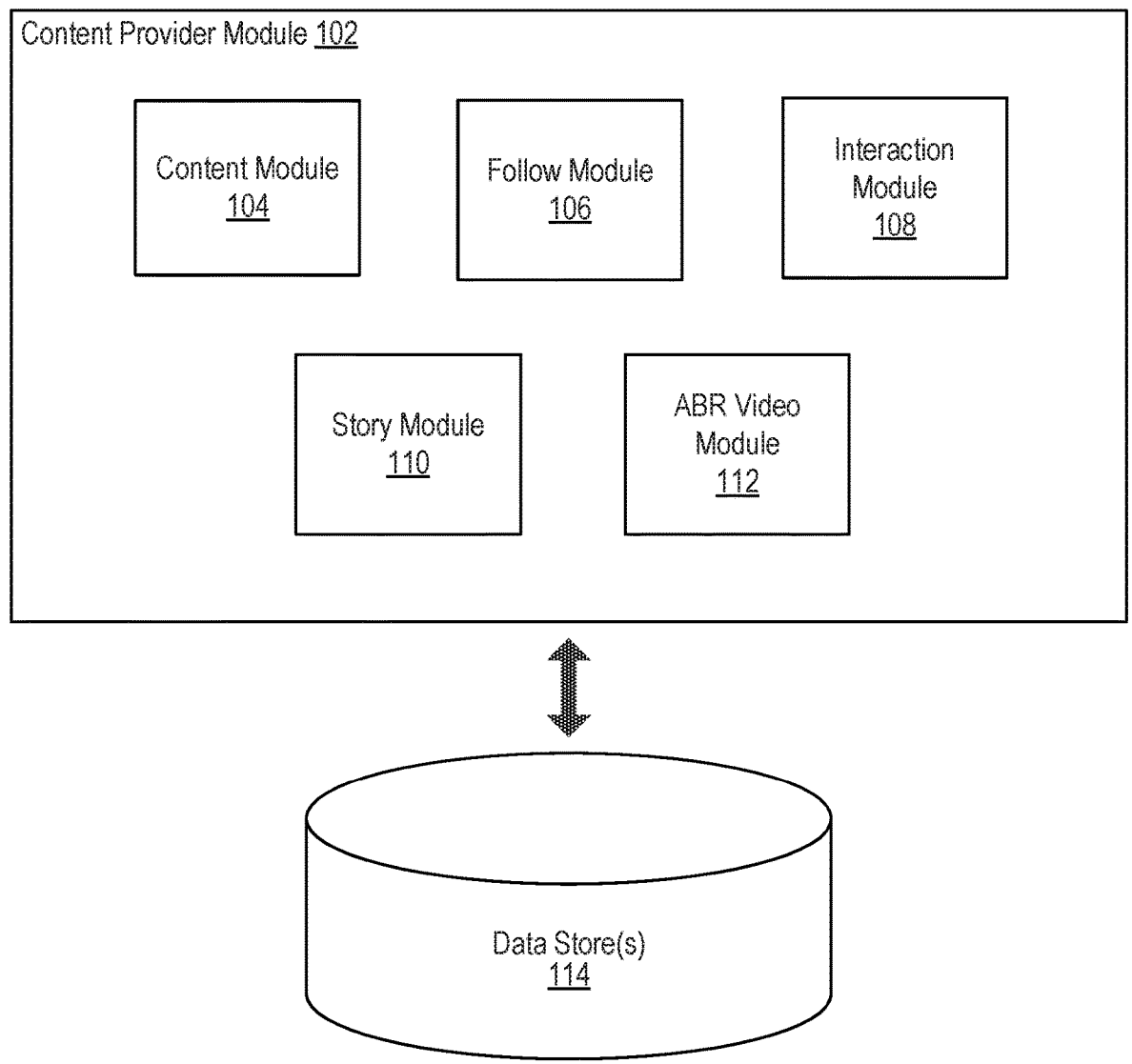
FIG. 1 illustrates an example system including a content provider module, according to an embodiment of the present technology.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Approaches for Providing Passthrough Adaptive Bitrate Videos

People often utilize computing devices (or systems) for a wide variety of purposes. Users can use their computing devices to, for example, interact with one another, access content, share content, and create content. In some cases, content items can include postings from members of a social networking system. Content items may include media content items, such as videos. Content items may be published to the social networking system or any other content platform for consumption by others.

Content platforms, such as social networking systems, may provide users with access to a library of videos that are available on demand. In certain instances, such videos may be provided as adaptive bitrate (ABR) videos. When a video is provided as an ABR video, the video may be encoded at different levels of quality such that the quality of video playback can be adjusted based on various factors including, for example, available bandwidth of a client device. If a client device has a higher available bandwidth, the client device can be provided with a higher quality encoding for higher quality video playback, but if the client device has a lower available bandwidth, the client device can be provided with a lower quality encoding for lower quality video playback. However, conventional approaches to providing ABR videos face several drawbacks. One drawback arises from the fact that encoding a video at different levels of quality necessarily results in some degradation of the original video, such that users can never experience the highest available video quality (i.e., the quality of the original video). Furthermore, preparing encodings at different quality levels is very resource-intensive, especially when preparing encodings at higher quality levels (e.g., HD quality encodings). This is particularly problematic given the fact that users are uploading more video content than ever before and, as camera technology improves, the uploaded video content is of a higher quality than ever before. During peak times, content platforms may simply lack the computing resources to effectively process all of the high quality video content being uploaded by users. Yet another problem with conventional approaches to ABR video processing is the storage required to maintain all of the different encodings for each video. As mentioned above, users are uploading video content at unprecedented rates. In order to provide ABR video playback, each video must be encoded at multiple quality levels, and each individual encoding must be stored. The amount of storage required to store multiple versions of every video uploaded to a content platform can become prohibitive. Such long-term storage of ABR videos is also very inefficient given that many videos on a content platform may not be viewed frequently, if at all. Conventional approaches may not be effective in addressing these and other problems arising in computer technology.

An improved approach rooted in computer technology overcomes the foregoing and other disadvantages associated with conventional approaches specifically arising in the realm of computer technology. In general, a video (e.g., a video uploaded by a user) can be received. In an embodiment, rather than transcoding the video at a plurality of different quality levels, the video can be transmuxed to create a passthrough-quality encoding. The passthrough-quality encoding may have the same, or substantially the same level of quality as the original video. In an embodiment, transmuxing does not involve re-encoding the video. Rather, transmuxing takes the video stream and the audio stream from the video and packages them in an alternative format. In an embodiment, the passthrough-quality encoding maintains identical segment structure as the original video. For example, the passthrough-quality encoding can maintain identical (or substantially identical) IDR (Instantaneous Decoder Refresh) frame positions as the original video. This may be in contrast to certain conventional approaches, which place IDR frames at pre-fixed locations within transcodings rather than utilizing the IDR frame positions of the original video. A plurality of passthrough-aligned transcodings of varying quality levels (e.g., varying bitrates) can be generated based on the passthrough-quality encoding. The passthrough-aligned transcodings can maintain the same segment structure and IDR frame positions as the passthrough-quality encoding (and, therefore, the original video). In certain embodiments, the original video, the passthrough-quality encoding, and the passthrough-aligned transcodings may not have identical segment structures, but may have segment structures that are compatible with one another for purposes of ABR quality switching, as will be described in greater detail herein. The passthrough-quality encoding and the plurality of passthrough-aligned transcodings can define an ABR video package (e.g., a DASH manifest) that can be utilized by an ABR video player to play the video as an ABR video. In certain embodiments, generating the passthrough-quality encoding and the plurality of passthrough-aligned transcodings can be performed based on a determination that the video satisfies a set of passthrough eligibility criteria.

Various embodiments of the present technology provide several advantages over conventional approaches. In one example, the present technology can provide a higher level of video quality than conventional approaches. The passthrough-quality encoding represents the highest available level of quality (i.e., an identical level of quality to a user-uploaded video), whereas conventional transcodings typically result in some degradation, even for the highest quality transcodings. Furthermore, this higher level of video quality is achieved while also improving computing resource efficiency (e.g., CPU efficiency) and encoding latency. This is due to the fact that transmuxing the user uploaded video is much less resource intensive and faster than transcoding the user uploaded video to generate a high-quality transcoding that can only approximate the quality of the original video. Furthermore, efficiencies in long-term storage can be achieved by storing the passthrough-quality encoding without storing some or all of the passthrough-aligned transcodings, and generating the passthrough-aligned transcodings as needed. More details relating to the disclosed technology are provided below.

FIG. 1 illustrates an example system 100 including a content provider module 102, according to an embodiment of the present technology. The content provider module 102 can be configured to provide users with access to content posted to a digital content platform, such as a social networking system. Such content can include ABR videos. As shown in the example of FIG. 1, the content provider module 102 can include a content module 104, a follow module 106, an interaction module 108, a story module 110, and an ABR video module 112. In some instances, the example system 100 can include at least one data store 114. The components (e.g., modules, elements, etc.) shown in this figure and all figures herein are exemplary only, and other implementations may include additional, fewer, integrated, or different components. Some components may not be shown so as not to obscure relevant details. In various embodiments, one or more of the functionalities described in connection with the content provider module 102 can be implemented in any suitable combinations.

In some embodiments, the content provider module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the content provider module 102 can be, in part or in whole, implemented as software running on one or more computing devices or systems, such as on a server system or a client computing device. In some instances, the content provider module 102 can be, in part or in whole, implemented within or configured to operate in conjunction with or be integrated with a social networking system (or service), such as a social networking system 630 of FIG. 6. Likewise, in some instances, the content provider module 102 can be, in part or in whole, implemented within or configured to operate in conjunction with or be integrated with a client computing device, such as the user device 610 of FIG. 6. For example, the content provider module 102 can be implemented as or within a dedicated application (e.g., app), a program, or an applet running on a user computing device or client computing system. The application incorporating or implementing instructions for performing functionality of the content provider module 102 can be created by a developer. The application can be provided to or maintained in a repository. In some cases, the application can be uploaded or otherwise transmitted over a network (e.g., Internet) to the repository. For example, a computing system (e.g., server) associated with or under control of the developer of the application can provide or transmit the application to the repository. The repository can include, for example, an "app" store in which the application can be maintained for access or download by a user. In response to a command by the user to download the application, the application can be provided or otherwise transmitted over a network from the repository to a computing device associated with the user. For example, a computing system (e.g., server) associated with or under control of an administrator of the repository can cause or permit the application to be transmitted to the computing device of the user so that the user can install and run the application. The developer of the application and the administrator of the repository can be different entities in some cases, but can be the same entity in other cases. It should be understood that many variations are possible.

The content provider module 102 can be configured to communicate and/or operate with the at least one data store 114, as shown in the example system 100. The data store 114 can be configured to store and maintain various types of data. In some implementations, the data store 114 can store information associated with the social networking system (e.g., the social networking system 630 of FIG. 6). The information associated with the social networking system can include data about users, user identifiers, social connections, social interactions, profile information, demographic information, locations, geo-fenced areas, maps, places, events, pages, groups, posts, communications, content, feeds, account settings, privacy settings, a social graph, and various other types of data. In some embodiments, the data store 114 can store information that is utilized by the content provider module 102. For example, the data store 114 can store user-uploaded videos, passthrough-quality encodings, passthrough-aligned transcodings, and the like. It is contemplated that there can be many variations or other possibilities.

The content module 104 can be configured to provide users with access to content that is available through a digital content platform, such as a social networking system. In some instances, this content can include content items posted in content feeds accessible through the social networking system, i.e., content posts. For example, the content module 104 can provide a first user with access to content posts through an interface that is provided by a software application (e.g., a social networking application) running on a computing device of the first user. The first user can also interact with the interface to post content posts to the social networking system. Such content posts may include text, images, audio, and videos, to name some examples. For example, the first user can submit a content post to be published through the social networking system. In some embodiments, the content post can include, or reference, one or more media content items, such as images, video, audio, and/or text.

In various embodiments, other users of the social networking system can access content posts posted by the first user. In one example, the other users can access the content posts by searching for the first user by user name through an interface provided by a software application (e.g., a social networking application, browser, etc.) running on their respective computing devices. In some instances, some users may want to see content posts posted by the first user in their respective content feed. To cause content posts posted by the first user to be included in their respective content feed, a user can select an option through the interface to subscribe to, or "follow", the first user. The follow module 106 can process the user's request by identifying the user as a follower of (or "friend" of) the first user in the social networking system. As a result, some or all content posts that are posted by the first user can automatically be included in the respective content feed of the user. If the user decides that they no longer want to see content from the first user in their respective content feed, the user can select an option through the interface to unsubscribe from, or "unfollow", the first user. As a result, the follow module 106 can remove the association between the user and the first user so that content posts posted by the first user are no longer included in the content feed of the user.

In some instances, users may want to interact with content posts posted to a social networking system. For example, a user may want to endorse, or "like", a content post. In this example, the user can select an option provided in the interface to like the desired content post. The interaction module 108 can determine when a user likes a given content post and can store information describing this relationship. The interaction module 108 can also determine when other forms of user interaction are performed and can store information describing the interaction (e.g., information describing the type of interaction, the identity of the user, the identity of the user that posted the content post, and the content post, to name some examples). For example, the user may want to post a comment in response to a content post. In this example, the user can select an option provided in the interface to enter and post the comment for the desired content post. The interaction module 108 can determine when a user posts a comment in response to a given content post and can store information describing this relationship. Other forms of user interaction can include emoji-based reactions to a content post (e.g., selecting an option that corresponds to a particular reaction emoji, e.g., happy, sad, angry, etc.), re-sharing a content post, and transmitting a message to a user pertaining to a particular content post, for example.

In some embodiments, the story module 110 can provide an option that allows users to post their content as stories. In such embodiments, each user has a corresponding story collection in which the user can post content. When a user's story collection is accessed by another user, the story module 110 can provide content posted in the story collection to the other user for viewing. In certain embodiments, each user can have a story feed in which they can view stories posted by other users to their respective story collections. As such, a user's story feed can include the story collections of one or more users (e.g., one or more users that the user follows). In some embodiments, content posted in a user's story collection may be accessible by any user of the social networking system. In some embodiments, content posted in a user's story collection may only be accessible to followers of the user. In some embodiments, user stories posted to a user's story collection expire after a pre-defined time interval (e.g., every 24 hours). In such embodiments, content posted as a story in a story collection is treated as ephemeral content that is made inaccessible once the pre-defined time interval has elapsed. In contrast, content posted in certain other content feeds, such as a user (or follower) primary content feed, can be treated as non-ephemeral content that remains accessible for a longer and/or an indefinite period of time.

The ABR video module 112 can be configured to receive a video, such as a user-uploaded video. In an embodiment, the ABR video module 112 can transmux the video to create a passthrough-quality encoding. The passthrough-quality encoding may have the same, or substantially the same level of quality as the original video. In an embodiment, the video may comprise a plurality of segments, and each segment may begin with an IDR frame. The plurality of segments and the positions of the IDR frames may define a segment structure for the video. In an embodiment, the passthrough-quality encoding may maintain identical segment structure as the original video. For example, the passthrough-quality encoding can maintain the same number of segments as the original video, each segment in the passthrough-quality encoding may correspond with a respective segment in the original video, the plurality of segments in the passthrough-quality encoding may have the same ordering and lengths as the plurality of segments in the original video, and the passthrough-quality encoding may maintain identical (or substantially identical) IDR frame positions as the original video. In an embodiment, the passthrough-quality encoding may have a segment structure that is not identical to the original video, but is compatible with the original video for ABR video quality switching. For example, the passthrough-quality encoding may have fewer IDR frames than the original video, and each IDR frame in the passthrough-quality encoding may have a corresponding IDR frame in the original video (e.g., an IDR frame having the same or approximately the same position). The ABR video module 112 can generate a plurality of passthrough-aligned transcodings of varying quality levels (e.g., varying bitrates or varying resolutions) based on the passthrough-quality encoding. In an embodiment, the passthrough-aligned transcodings may maintain the same segment structure as the passthrough-quality encoding (and, therefore, the original video). In another embodiment, the passthrough-aligned transcodings may have a segment structure that is not identical to the original video and/or the passthrough-quality encoding, but is still compatible with the original video and/or the passthrough-quality encoding for ABR quality switching. For example, the passthrough-aligned transcodings may have fewer IDR frames than the passthrough-quality encoding, but each IDR frame in a passthrough-aligned transcoding may have a corresponding IDR frame in the passthrough-quality encoding (e.g., an IDR frame having the same or substantially the same position). The passthrough-quality encoding and the plurality of passthrough-aligned transcodings can define an ABR video package that can be utilized by an ABR video player to play the video as an ABR video. In certain embodiments, the ABR video module 112 may generate the passthrough-quality encoding and the plurality of passthrough-aligned transcodings based on a determination that the video satisfies a set of passthrough eligibility criteria. More details regarding the ABR video module 112 will be provided below with reference to FIG. 2.

Figure 2:
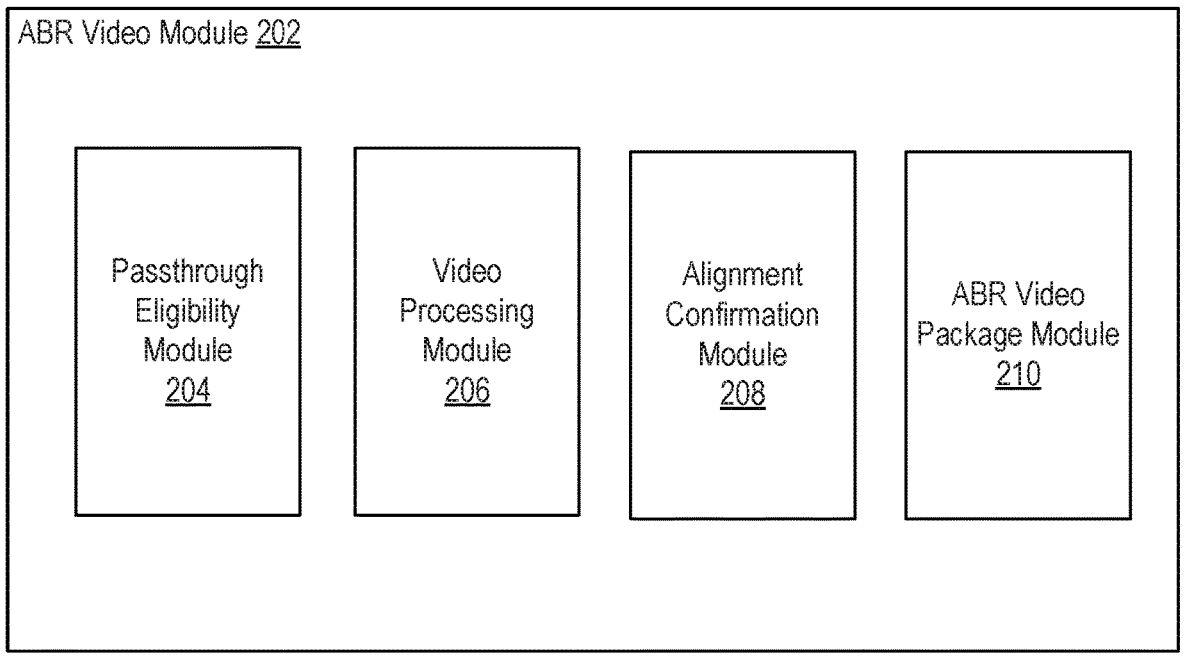
FIG. 2 illustrates an example ABR video module, according to an embodiment of the present technology.

FIG. 2 illustrates an example ABR video module 202 configured to process videos, according to an embodiment of the present technology. In some embodiments, the ABR video module 112 of FIG. 1 can be implemented as the ABR video module 202. As shown in the example of FIG. 2, the ABR video module 202 can include a passthrough eligibility module 204, a video processing module 206, an alignment confirmation module 208, and an ABR video package module 210.

The passthrough eligibility module 204 can be configured to receive a video. The video may be, for example, a video uploaded by a user to a content platform, such as a social networking system. In an embodiment, the passthrough eligibility module 204 can be configured to determine whether the video satisfies a set of passthrough eligibility criteria. In an embodiment, if the video satisfies the passthrough eligibility criteria, a passthrough-quality encoding of the video may be generated (e.g., by the video processing module 206), and an ABR video package may be generated which includes the passthrough-quality encoding. However, if the video does not satisfy the passthrough eligibility criteria, the video may be processed differently. For example, a plurality of transcodings may be generated based on the video, and an ABR video package may be generated which does not include a passthrough-quality encoding. These features will be described in greater detail below with reference to the video processing module 206, the alignment confirmation module 208, and the ABR video package module 210.

In an embodiment, the passthrough eligibility criteria can include a video codec criteria which defines one or more selected or approved video codecs that are appropriate for generating a passthrough-quality encoding. If the received video (e.g., the user-uploaded video) is not encoded using one of the one or more selected or approved video codecs, the video may be determined not to satisfy the passthrough eligibility criteria. Conversely, if the video is encoded using one of the one or more approved video codecs, the video can be determined to satisfy the video codec criteria. Similarly, the passthrough eligibility criteria can include an audio codec criteria which defines one or more selected or approved audio codecs that are appropriate for generating a passthrough-quality encoding. If the received video is not encoded using one of the one or more selected or approved audio codecs, the video may be determined not to satisfy the passthrough eligibility criteria. Conversely, if the video is determined to be encoded using one of the one or more selected or approved audio codecs, the video can be determined to satisfy the audio codec criteria.

In an embodiment, the passthrough eligibility criteria can include a bitrate criteria including a bitrate threshold. For example, the bitrate criteria may require that the received video does not exceed the bitrate threshold (e.g., does not exceed 20 MBps). The bitrate criteria may be implemented because if a video is of sufficiently high quality (e.g., the bitrate exceeds the bitrate threshold), it may not be practical or desirable to create a passthrough-quality encoding with the same bitrate as the original video, and it may be more desirable to generate lower quality (lower bitrate) transcodings.

In an embodiment, the passthrough eligibility criteria may include an alignment check criteria. The alignment check criteria is described in greater detail below with reference to the alignment confirmation module 208.

The video processing module 206 can be configured to generate a plurality of encodings for a video. The plurality of encodings may have varying quality levels (e.g., varying bitrates, varying resolutions, etc.). The plurality of encodings may be used to generate an ABR video package and/or as part of an ABR video package such that the video can be played as an ABR video by an ABR video player. In an embodiment, the plurality of encodings can include a passthrough-quality encoding and a plurality of passthrough-aligned transcodings. In an embodiment, the video processing module 206 can generate a passthrough-quality encoding of the video by transmuxing the video. The video processing module 206 can generate a plurality of passthrough-aligned transcodings of varying quality levels (e.g., varying bitrates, varying resolutions, etc.) based on the passthrough-quality encoding. For example, the video processing module 206 can transcode the passthrough-quality encoding at varying bitrates or varying resolutions to generate the plurality of passthrough-aligned transcodings. As discussed above, a video may comprise a plurality of segments, and each segment may begin with an IDR frame. The plurality of segments and IDR frames may, at least in part, define a segment structure for the video. In an embodiment, the passthrough-quality encoding may maintain identical segment structure as the original video. For example, the passthrough-quality encoding can maintain the same number of segments as the original video, each segment in the passthrough-quality encoding may correspond with a respective segment in the original video, the plurality of segments in the passthrough-quality encoding may have the same ordering and lengths as the plurality of segments in the original video, and/or the passthrough-quality encoding may maintain identical (or substantially identical) IDR frame positions as the original video. In an embodiment, the plurality of passthrough-aligned transcodings may maintain the same segment structure as the passthrough-quality encoding (and, therefore, the original video). In an embodiment, the passthrough-quality encoding may have a segment structure that is not identical to the original video, but is compatible with the original video for ABR quality switching. For example, the passthrough-quality encoding may have fewer IDR frames (and, therefore, fewer segments) than the original video, but each IDR frame in the passthrough-quality encoding may have a corresponding IDR frame (e.g., an IDR frame having the same or approximately the same position) in the original video. Similarly, the plurality of passthrough-aligned transcodings may have segment structures that are not identical to the passthrough-quality encoding or the original video, but are compatible with the passthrough-quality encoding and/or the original video for ABR quality switching.

Figure 3A:
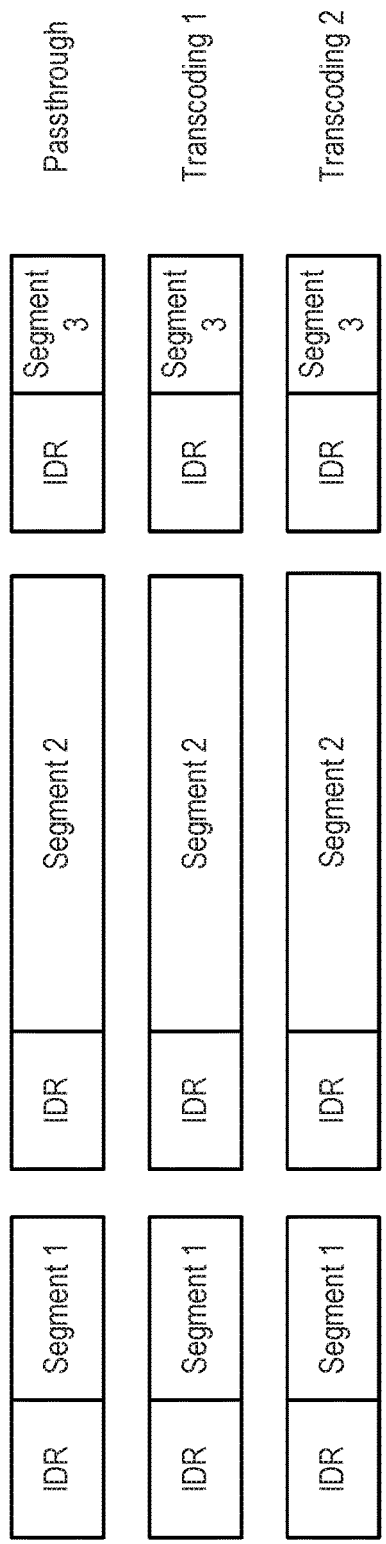
FIG. 3A illustrates an example scenario associated with providing adaptive bitrate videos, according to an embodiment of the present technology.
Figure 3B:
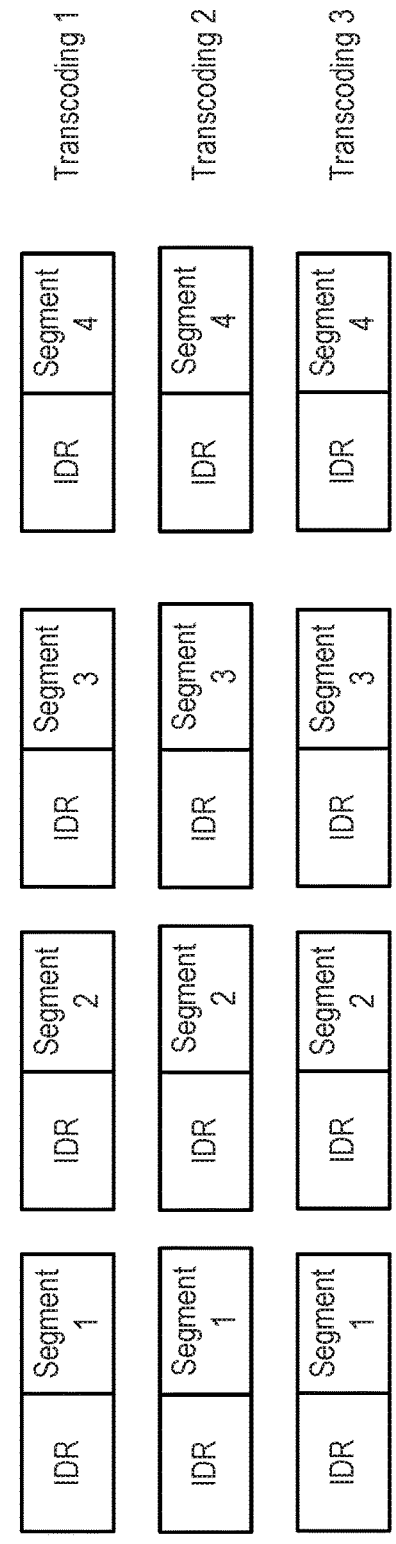
FIG. 3B illustrates an example scenario associated with providing adaptive bitrate videos, according to an embodiment of the present technology.

In an embodiment, the video processing module 206 can generate the passthrough-quality encoding and the plurality of passthrough-aligned transcodings based on a determination that the video satisfies passthrough eligibility criteria. The passthrough-quality encoding and the plurality of passthrough-aligned transcodings can be used to determine an ABR video package for the video. In an embodiment, if the video is determined not to satisfy the passthrough eligibility criteria, the video processing module 206 can generate a plurality of transcodings of various qualities (e.g., various bitrates, various resolutions, etc.). The plurality of transcodings may be used to determine an ABR video package for the video, and the ABR video package may not include a passthrough-quality encoding. In an embodiment, the plurality of transcodings may have a different segment structure from the original video. The plurality of transcodings may not be compatible with the original video for ABR quality switching due to their segment structures. For example, the plurality of transcodings may have pre-fixed or pre-defined segment lengths and/or pre-fixed or pre-defined IDR frame positions that are different from the segment lengths and/or IDR frame positions of the original video. FIGS. 3A and 3B illustrate two example scenarios. In FIG. 3A, a video is determined to satisfy passthrough eligibility criteria. As such, a passthrough-quality encoding having identical segment structure to the video is generated (e.g., by transmuxing the video). Two passthrough-aligned transcodings (Transcoding 1 and Transcoding 2) of varying qualities (e.g., varying bitrates, varying resolutions) and having identical segment structure to the original video are generated based on the passthrough-quality encoding. The passthrough-quality encoding, and the two transcodings of varying quality levels can define at least part of an ABR video package for the video. Conversely, in FIG. 3B, the video is determined not to satisfy passthrough eligibility criteria. In this case, a passthrough-quality encoding is not included as part of the ABR video package for the video. Rather, the video is transcoded into a plurality of transcodings of varying qualities (e.g., varying bitrates, varying resolutions). Furthermore, while the plurality of transcodings have segment structures that are identical to one another and/or compatible with one another for ABR quality switching, the segment structures differ from the original video and are not compatible with the original video for ABR quality switching. The segment lengths and IDR frame positions in the plurality of transcodings may be pre-fixed and/or pre-determined, and may not correspond to the segment lengths or IDR frame positions of the original video.

Returning to FIG. 2, the alignment confirmation module 208 can be configured to determine whether a passthrough-quality encoding and/or one or more passthrough-aligned transcodings do, in fact, have segment structures that are compatible with the original video and/or with one another for ABR quality switching. In an embodiment, the alignment confirmation module 208 can be configured to check alignment of different encodings based on segment information associated with each encoding. In an embodiment, segment information for an encoding may include a start timestamp for a first segment in the encoding, identification of each segment in the encoding (thereby identifying the number of segments in the encoding), and/or a duration of each segment in the encoding. Segment information may be, for example, SIDX information contained in a SIDX box associated with an encoding. In an embodiment, a determination as to whether two encodings are aligned (i.e., whether they have segment structures that are compatible for ABR quality switching) may be made based on comparison of segment information for the two encodings. For example, a passthrough-quality encoding may be associated with a first set of SIDX information which indicates a starting timestamp of a first segment of the passthrough-quality encoding, identifies each segment in the passthrough-quality encoding, and identifies a duration of each segment in the passthrough-quality encoding. A first passthrough-aligned transcoding may be associated with a second set of SIDX information that includes the same information for the first passthrough-aligned transcoding. A determination as to whether the first passthrough-aligned transcoding aligns with the passthrough-quality encoding (i.e., whether they have segment structures that are compatible for ABR quality switching) can be made by determining whether they have the same starting timestamp within a threshold time (e.g., within 1 ms), by comparing the number of segments, and/or by comparing the durations of the segments to determine whether the position of each IDR frame in the first passthrough-aligned transcoding aligns with the position of a corresponding IDR frame in the passthrough-quality encoding within a threshold deviation (e.g., within 1 ms).

As introduced above, the passthrough eligibility criteria enforced by the passthrough eligibility module 204 may include alignment criteria. In an embodiment, the video processing module 206 may, based on a received video, generate a passthrough-quality encoding and a low quality passthrough-aligned transcoding. This is because the passthrough-quality encoding and the low quality passthrough-aligned transcoding can generally be generated very quickly. Before generating any additional passthrough-aligned transcodings, the alignment confirmation module 208 can determine whether the low quality passthrough-aligned transcoding aligns with the passthrough-quality encoding (i.e., whether the two have segment structures that are compatible for ABR quality switching). If the low quality passthrough-aligned transcoding does align with the passthrough-quality encoding, additional passthrough-aligned transcodings of varying qualities can be generated by the video processing module 206. However, if the low quality passthrough-aligned transcoding does not align with the passthrough-quality encoding, the video does not satisfy the alignment criteria and, therefore, does not satisfy the passthrough eligibility criteria. As such, the passthrough-quality encoding can be excluded from the ABR video package and the video processing module 206 can generate a plurality of transcodings that have compatible segment structures with one another, but are not compatible with the segment structure of the original video.

The ABR video package module 210 can be configured to generate an ABR video package for a received video. The ABR video package can include a plurality of encodings of varying qualities associated with the received video. The ABR video package module 210 can generate a manifest (e.g., a DASH manifest) which associates the received video with the plurality of encodings. The manifest may identify each encoding associated with the received video, as well as quality level (e.g., a bitrate, a resolution, etc.) for each encoding, and other relevant information for each encoding (e.g., a URL from which the encoding can be retrieved). The plurality of encodings may include, for example, a passthrough-quality encoding and a plurality of passthrough-aligned transcodings of varying qualities. In other instances, the plurality of encodings may include, for example, a plurality of transcodings of varying qualities without a passthrough-quality encoding. The ABR video package module 210 may provide the manifest to an ABR video player so that the ABR video player can utilize the manifest to play the video as an ABR video.

Figure 4:
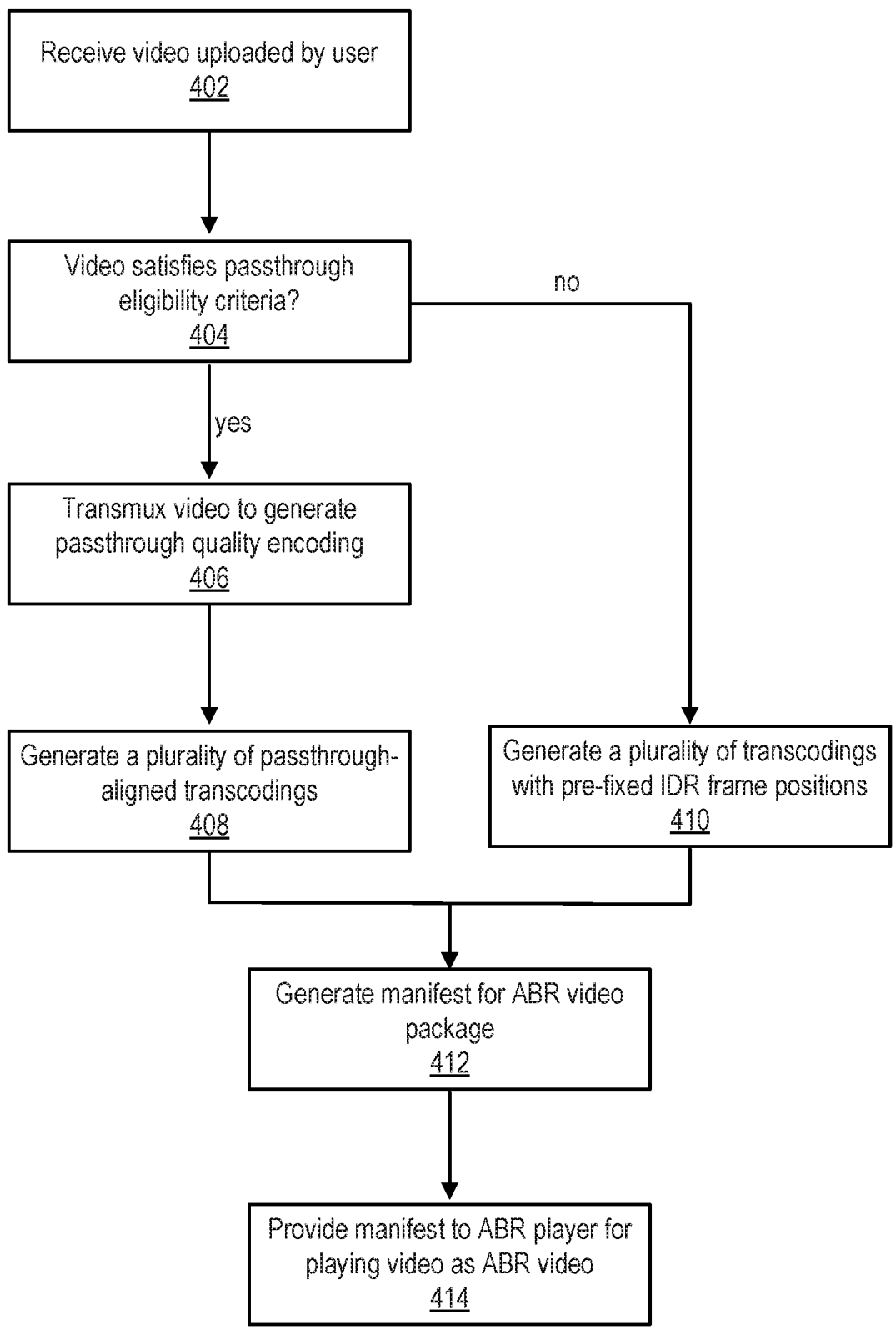
FIG. 4 illustrates an example flow chart associated with processing adaptive bitrate videos, according to an embodiment of the present technology.

FIG. 4 illustrates an example flow chart, according to an embodiment of the present technology. At block 402, a video uploaded by a user is received. At block 404, a determination is made as to whether the video satisfies passthrough eligibility criteria. If yes, the flow chart progresses to block 406, where the video is transmuxed to generate a passthrough-quality encoding. Then, at block 408, a plurality of passthrough-aligned transcodings are generated based on the passthrough-quality encoding. If, at block 404, the video is determined not to satisfy passthrough eligibility criteria, the flow chart moves from block 404 to block 410, where a plurality of transcodings with pre-fixed IDR frame positions are generated. At block 412, a manifest is generated which identifies all encodings associated with the video. The manifest and the encodings identified in the manifest define an ABR video package associated with the video. At block 414, the manifest is provided to an ABR video player for playing the video as an ABR video. In certain embodiments, the passthrough eligibility criteria may include alignment criteria, which may require that a passthrough-quality encoding and a low quality passthrough-aligned transcoding are generated and compared to one another in order to determine whether or not the passthrough eligibility criteria are satisfied. In such instances, the passthrough-quality encoding and a low quality passthrough-aligned transcoding may be generated prior to determining whether the video satisfies the passthrough eligibility criteria. If the video satisfies the passthrough eligibility criteria, the passthrough-quality encoding and the low quality passthrough-aligned transcoding may be utilized as part of the ABR video package for the video. However, if the video does not satisfy the passthrough eligibility criteria, the passthrough-quality encoding and the low quality passthrough-aligned transcoding may not be utilized as part of the ABR video package for the video.

Figure 5:
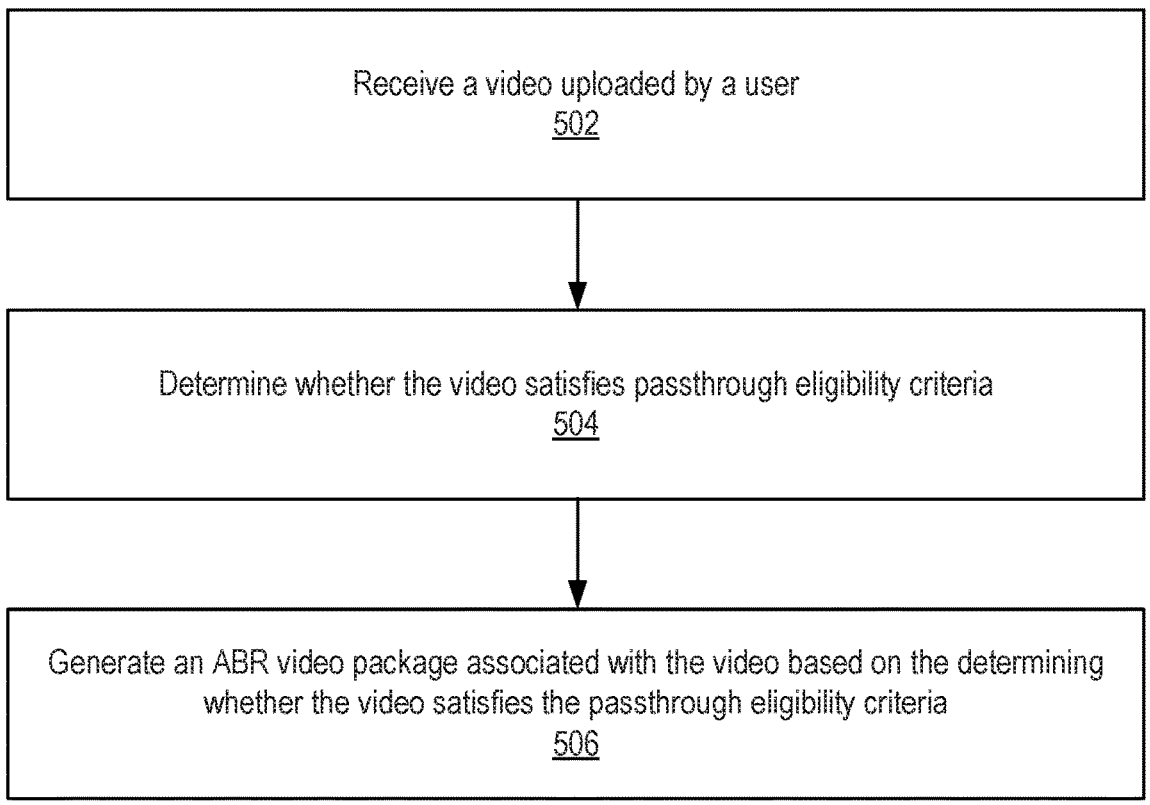
FIG. 5 illustrates an example method, according to an embodiment of the present technology.

FIG. 5 illustrates an example method 500, according to an embodiment of the present technology. It should be appreciated that there can be additional, fewer, or alternative steps performed in similar or alternative orders, or in parallel, within the scope of the various embodiments discussed herein unless otherwise stated.

At block 502, the example method 500 can receive a video uploaded by a user. At block 504, the example method 500 can determine whether the video satisfies passthrough eligibility criteria. At block 506, the example method 500 can generate an ABR video package associated with the video based on the determining whether the video satisfies the passthrough eligibility criteria.

It is contemplated that there can be many other uses, applications, and/or variations associated with the various embodiments of the present technology. For example, in some cases, user can choose whether or not to opt-in to utilize the disclosed technology. The disclosed technology can also ensure that various privacy settings and preferences are maintained and can prevent private information from being divulged. In another example, various embodiments of the present technology can learn, improve, and/or be refined over time.

Social Networking System—Example Implementation

Figure 6:
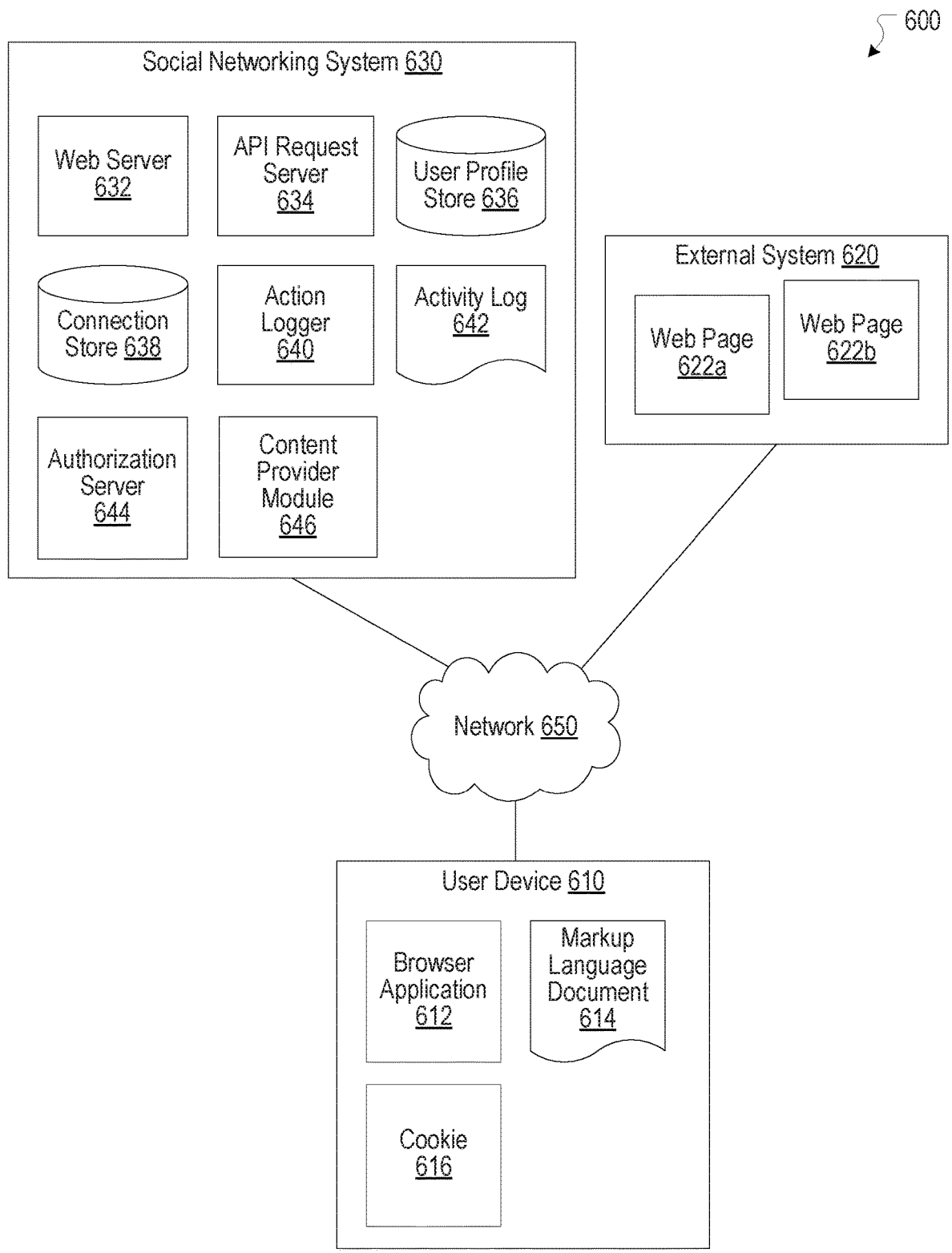
FIG. 6 illustrates a network diagram of an example system including an example social networking system that can be utilized in various scenarios, according to an embodiment of the present technology.

FIG. 6 illustrates a network diagram of an example system 600 that can be utilized in various scenarios, according to an embodiment of the present technology. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices that can receive input from a user and transmit and receive data via the network 650. In one embodiment, the user device 610 is a conventional computer system executing, for example, a Microsoft Windows compatible operating system (OS), Apple OS X, and/or a Linux distribution. In another embodiment, the user device 610 can be a device having computer functionality, such as a smart-phone, a tablet, a personal digital assistant (PDA), a mobile telephone, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the SilverLight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 650. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities.

The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622*a* within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the social networking system 630 can include a content provider module 646. The content provider module 646 can, for example, be implemented as the content provider module 102, as discussed in more detail herein. As discussed previously, it should be appreciated that there can be many variations or other possibilities. For example, in some embodiments, one or more functionalities of the content provider module 646 can be implemented in the user device 610. As discussed previously, it should be appreciated that there can be many variations or other possibilities.

Hardware Implementation

Figure 7:
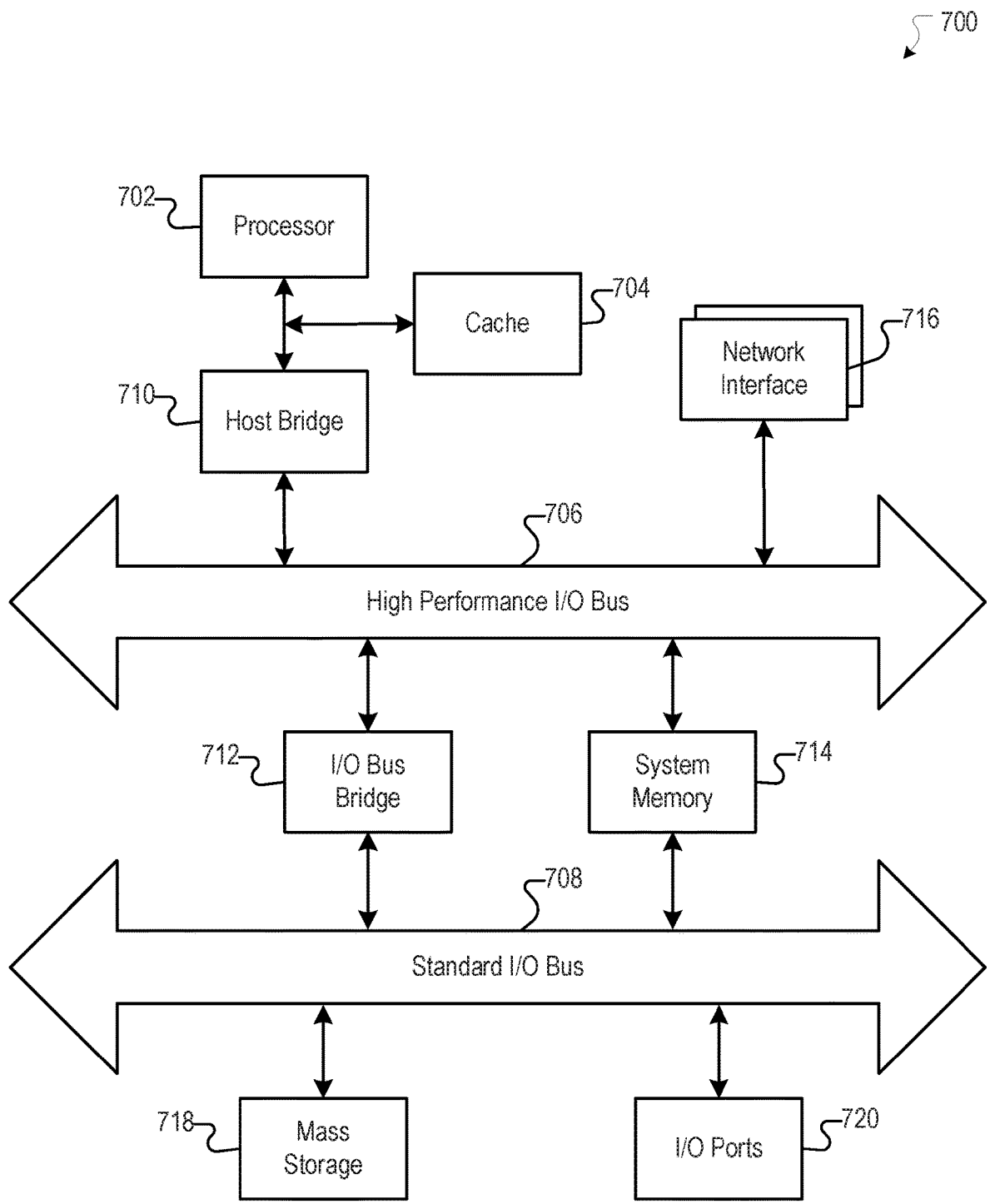
FIG. 7 illustrates an example of a computer system or computing device that can be utilized in various scenarios, according to an embodiment of the present technology.

The foregoing processes and features can be implemented by a wide variety of machine and computer system architectures and in a wide variety of network and computing environments. FIG. 7 illustrates an example of a computer system 700 that may be used to implement one or more of the embodiments described herein according to an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 620, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the technology can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the present technology. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   receiving, by a computing system, a video uploaded by a user;
   determining, by the computing system, whether the video satisfies passthrough eligibility criteria, wherein the determining whether the video satisfies passthrough eligibility criteria comprises:
      generating a passthrough-quality encoding of the video, wherein the passthrough-quality encoding of the video has a segment structure that is compatible with the video for adaptive bitrate (ABR) quality switching;
      generating at least one low quality passthrough-aligned transcoding of the video; and
      determining whether the at least one low quality passthrough-aligned transcoding aligns with the passthrough-quality encoding, wherein the determining comprises:
         determining whether the segment structure of the passthrough-quality encoding aligns with a segment structure associated with the at least one low quality passthrough-aligned transcoding; and
   generating, by the computing system, an ABR video package associated with the video based on the determining whether the video satisfies the passthrough eligibility criteria.

2. The computer-implemented method of claim 1, wherein the determining whether the video satisfies passthrough eligibility criteria comprises determining that the video satisfies the passthrough eligibility criteria, and the generating the ABR video package associated with the video comprises including the passthrough-quality encoding in the ABR video package based on the determining that the video satisfies the passthrough eligibility criteria.

3. The computer-implemented method of claim 2, wherein the generating the passthrough-quality encoding of the video comprises transmuxing the video.

4. The computer-implemented method of claim 3, wherein the passthrough-quality encoding of the video has the same bitrate as the video.

5. The computer-implemented method of claim 1, wherein the generating the ABR video package associated with the video further comprises:
  generating a plurality of passthrough-aligned transcodings based on the passthrough-quality encoding, wherein each passthrough-aligned transcoding is associated with a different quality level.

6. The computer-implemented method of claim 5, wherein the plurality of passthrough-aligned transcodings have segment structures that are compatible with the segment structure of the passthrough-quality encoding for ABR quality switching.

7. The computer-implemented method of claim 5, wherein the generating the ABR video package associated with the video further comprises:
  generating a manifest associated with the video, wherein the manifest identifies the passthrough-quality encoding and the plurality of passthrough-aligned transcodings.

8. The computer-implemented method of claim 7, further comprising providing the manifest to an ABR video player for playback of the video as an ABR video.

9. The computer-implemented method of claim 1, wherein:
  the one or more passthrough eligibility criteria comprise a bitrate criteria that defines a bitrate threshold, and
  the bitrate criteria causes the passthrough-quality encoding to be included in the ABR video package if the video has a bitrate that does not exceed the bitrate threshold and causes the passthrough-quality encoding not to be included in the ABR video package if the video has a bitrate that exceeds the bitrate threshold.

10. A system comprising:
  at least one processor; and
  a memory storing instructions that, when executed by the at least one processor, cause the system to perform a method comprising:
    receiving a video uploaded by a user;
    determining whether the video satisfies passthrough eligibility criteria, wherein the determining whether the video satisfies passthrough eligibility criteria comprises:
      generating a passthrough-quality encoding of the video, wherein the passthrough-quality encoding of the video has a segment structure that is compatible with the video for adaptive bitrate (ABR) quality switching;
      generating at least one low quality passthrough-aligned transcoding of the video; and
      determining whether the at least one low quality passthrough-aligned transcoding aligns with the passthrough-quality encoding, wherein the determining comprises:
        determining whether the segment structure of the passthrough-quality encoding aligns with a segment structure associated with the at least one low quality passthrough-aligned transcoding; and
    generating an ABR video package associated with the video based on the determining whether the video satisfies the passthrough eligibility criteria.

11. The system of claim 10, wherein
  the determining whether the video satisfies passthrough eligibility criteria comprises determining that the video satisfies the passthrough eligibility criteria, and
  the generating the ABR video package associated with the video comprises including the passthrough-quality encoding in the ABR video package based on the determining that the video satisfies the passthrough eligibility criteria.

12. The system of claim 11, wherein the generating the passthrough-quality encoding of the video comprises transmuxing the video.

13. The system of claim 12, wherein the passthrough-quality encoding of the video has the same bitrate as the video.

14. A non-transitory computer-readable storage medium including instructions that, when executed by at least one processor of a computing system, cause the computing system to perform a method comprising:
  receiving a video uploaded by a user;
  determining whether the video satisfies passthrough eligibility criteria, wherein the determining whether the video satisfies passthrough eligibility criteria comprises:
    generating a passthrough-quality encoding of the video, wherein the passthrough-quality encoding of the video has a segment structure that is compatible with the video for adaptive bitrate (ABR) quality switching;
    generating at least one low quality passthrough-aligned transcoding of the video; and
    determining whether the at least one low quality passthrough-aligned transcoding aligns with the passthrough-quality encoding, wherein the determining comprises:
      determining whether the segment structure of the passthrough-quality encoding aligns with a segment structure associated with the at least one low quality passthrough-aligned transcoding; and
  generating an ABR video package associated with the video based on the determining whether the video satisfies the passthrough eligibility criteria.

15. The non-transitory computer-readable storage medium of claim 14, wherein
  the determining whether the video satisfies passthrough eligibility criteria comprises determining that the video satisfies the passthrough eligibility criteria, and
  the generating the ABR video package associated with the video comprises including the passthrough-quality encoding in the ABR video package based on the determining that the video satisfies the passthrough eligibility criteria.

16. The non-transitory computer-readable storage medium of claim 15, wherein the generating the passthrough-quality encoding of the video comprises transmuxing the video.

17. The non-transitory computer-readable storage medium of claim 16, wherein the passthrough-quality encoding of the video has the same bitrate as the video.

18. The system of claim 10, wherein:
the one or more passthrough eligibility criteria comprise a bitrate criteria that defines a bitrate threshold, and
the bitrate criteria causes the passthrough-quality encoding to be included in the ABR video package if the video has a bitrate that does not exceed the bitrate threshold and causes the passthrough-quality encoding not to be included in the ABR video package if the video has a bitrate that exceeds the bitrate threshold.

19. The non-transitory computer-readable storage medium of claim 14, wherein:
the one or more passthrough eligibility criteria comprise a bitrate criteria that defines a bitrate threshold, and
the bitrate criteria causes the passthrough-quality encoding to be included in the ABR video package if the video has a bitrate that does not exceed the bitrate threshold and causes the passthrough-quality encoding not to be included in the ABR video package if the video has a bitrate that exceeds the bitrate threshold.

* * * * *